May 26, 1953 A. G. McKEE 2,639,550
APPARATUS FOR GROWING TENDER PLANTS
Filed Sept. 20, 1947 2 Sheets-Sheet 1

INVENTOR.
ARTHUR G. McKEE
BY
Richey & Watts
ATTORNEYS

INVENTOR.
ARTHUR G. McKEE
BY
Richey Watts
ATTORNEYS

Patented May 26, 1953

2,639,550

UNITED STATES PATENT OFFICE 2,639,550

APPARATUS FOR GROWING TENDER PLANTS

Arthur G. McKee, Cleveland, Ohio

Application September 20, 1947, Serial No. 775,200

9 Claims. (Cl. 47—17)

This invention relates generally to the art of greenhouse cultivation of tender plants and particularly to a new method of controlling the amount and nature of the sunlight which is admitted to such plants and of controlling the temperature and humidity of the air about the plants. It also relates to novel greenhouse construction suited for the cultivation of such plants.

All through the years in which orchids and other delicate plants have been raised in places away from their native haunts, efforts have been made to keep them under conditions similar to those under which they grew naturally. It was well known that when many tender plants, including orchids, were grown in greenhouses it was important to control the temperature and humidity of air surrounding the plants and the amount of light admitted to them.

The expedients resorted to heretofore to effect these controls have, so far as I am informed, been quite unsatisfactory. These expedients have included the spraying of water inside the greenhouse in an attempt to control humidity and the use of roofs made of painted glass to exclude sunlight and thereby to keep the temperature below that which would damage the plants.

The expedient of trying to control humidity by occasional spraying of water in the greenhouse gave quite non-uniform results for the moisture content in the air fluctuated within wide limits.

The exclusion of large amounts of sunlight did not keep the temperature as low as was desired for most tender plants. While some types of orchids may endure temperatures as high as 110° F. to 115° F. or even higher for short periods of time, they grow best at temperatures between about 70° F. and 80° F. Other families of orchids which should be grown in temperatures of about 50° F. to about 70° F. would probably die in temperatures as high as 90° F. to 95° F. Even when 75% of the midsummer sunlight was excluded, the temperature in the greenhouse was often higher than these preferred temperatures. Since the amount of sunlight which could be admitted safely was necessarily determined on the basis of the maximum sunlight available, which was at noon, it followed that much smaller amounts were admitted at other times. Since as much as 75% of the sunlight was so excluded in summer and from 75% to 50% in spring and fall, the average daily amounts actually admitted were quite low, as will presently appear. Also, the glass and paint excluded much of the light bands which are beneficial to plant growth, for example, ultra-violet light.

Tender plants, and particularly orchids, kept under these conditions, did not thrive or grow rapidly as compared with similar plants grown under natural conditions.

The present invention aims to provide a set of conditions which will be closely similar to the natural conditions under which tender plants do well and which will be conducive to the thriving, rapid growth of such plants, and accomplishes that aim by a new method and new apparatus. Briefly stated, this invention contemplates admitting to the plants all the available sunlight when it has a benign effect on the plants and excluding from the plants amounts of sunlight in excess of amounts under which the plants can thrive and also excluding cerain bands of the solar spectrum which are harmful to the plants; admitting a daily average of sunlight which is far in excess of the amount admitted when the prior expedients were in use and admitting light bands beneficial to plant culture; and creating a circulation of air into and out of the greenhouse in a manner to maintain the temperature and humidity of the atmosphere surrounding the plants at approximately that of the outside air in the shade.

My invention is in marked contrast to the prior expedients and procedures.

I create and maintain the desired conditions including control of the amount and quality of the sunlight admitted into the greenhouse and the temperature and humidity within the greenhouse by providing a greenhouse with a roof comprising flexible, translucent, protractile members capable of excluding part of the sunlight and with side walls having upper and lower openings and closures therefor and manipulating said roof members and closures to maintain the desired conditions of heat, light and humidity in the greenhouse.

In this manner I may cause air to circulate through the greenhouse and thereby maintain the temperature and humidity of the air about the same within the greenhouse as outside thereof in an adjacent shaded area, and I may admit to the plants full sunlight when it has a benign effect and may exclude amounts in excess thereof as well as undesired light bands of the solar spectrum which are harmful to the plants, while permitting other light bands which are beneficial to plant growth to enter the greenhouse.

By controlling the temperature and humidity of the air surrounding the plants and by controlling the amount of sunlight, both maximum and average, and the quality of the sunlight admitted to the plants, I am able to create and maintain a set of conditions in a greenhouse which, from the standpoint of their effect on the growth of tender plants, particularly orchids, are vastly superior to any prior set of conditions with which I am familiar.

Briefly described, apparatus embodying and with which the present invention may be carried out is a greenhouse which extends east and west and has a roof comprising a south slope, or both a south slope and a north slope, and one or more flexible, translucent curtains constituting the roof, which curtains may be rolled down to admit full sunlight or rolled up to cast a shadow on substantially all the plants in the greenhouse. Air circulating passages may be provided in the north and south walls of the greenhouse and may be equipped with curtains which may be rolled or unrolled to open or close the openings, depending on whether or not a circulation of air is desired in the greenhouse about the plants.

The present invention will be better understood by those skilled in the art from the drawings which accompany and form a part of this specification and in which.

Figure 1:
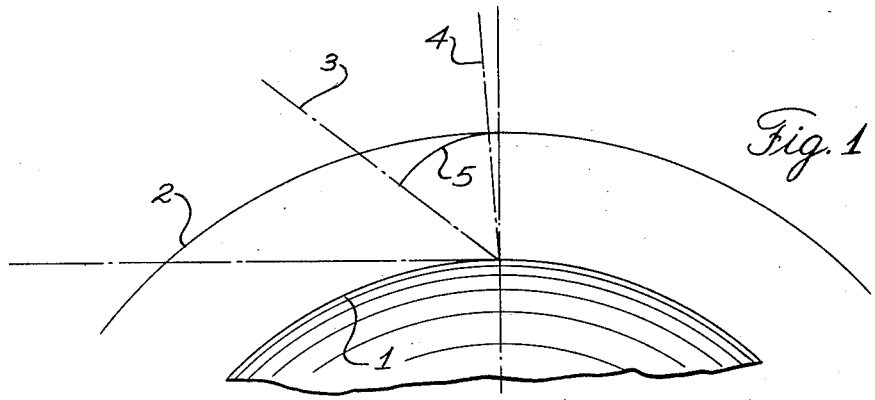
Fig. 1 is a diagrammatic drawing indicating the angularity of the sun's rays to the earth at Vero Beach, Florida, at noon in mid-summer and mid-winter and indicating distances thru which those rays travel in the earth's atmosphere before striking the earth at that place.

In Fig. 1, curve 1 indicates the circumference of the earth and curve 2 indicates the outer limit of the earth's atmosphere. Line 3, which makes an angle of 37° with a line tangent to the earth's surface at Vero Beach, Florida, indicates the angle of the sun's rays when the full sunlight is beneficial and may be admitted with safety to the plants. Line 4, which is drawn at an angle of about 86° to the aforesaid tangent, indicates the maximum mid-summer inclination of the sun's rays at Vero Beach, Florida. Arc 5 is drawn from the intersection of lines 3 and 4 on curve 1 with a radius equal to the radial length of the distance between lines 1 and 2, that is, the thickness of the earth's atmosphere. It will be noted that curve 5 intersects line 3 well within this atmosphere, which is but another way of saying that sunlight travels much farther through the earth's atmosphere when at an angle of 37° or below than it does when at an angle of 86°.

I believe that the reason why full sunlight is beneficial, and not injurious, to tender plants when the sun's rays are below a certain critical angle is due to the fact that the light in traveling this long distance through the earth's atmosphere is dispersed in part, a considerable portion of its heat energy is lost to the atmosphere and a large percentage of the light bands of the spectrum are absorbed, deflected or otherwise prevented from reaching the plants.

Figure 2:
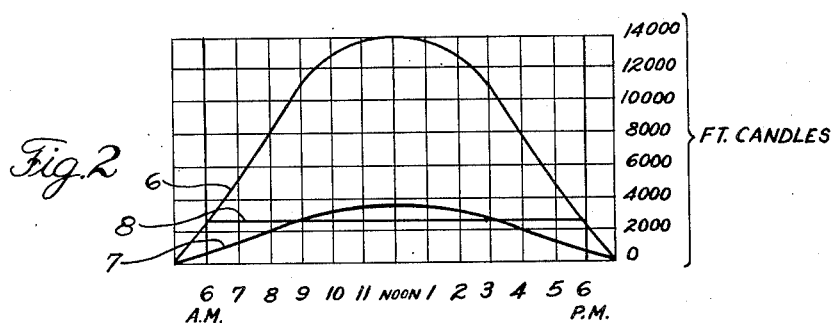
Fig. 2 is a chart showing the amount of sunlight, measured in foot candles, estimated to reach the earth at Vero Beach, Florida, in mid-summer, the amount of such sunlight which is admitted through the ordinary painted glass roof of a greenhouse and the average amount of sunlight admitted to the plants through such a roof throughout the twelve daylight hours indicated.

In Fig. 2, curve 6 indicates approximately the sunlight intensity in foot candles available in a day in mid-summer at Vero Beach, Florida. Curve 7 indicates approximately the amount of that light which is admitted through the ordinary painted glass roof of a greenhouse during the same period of time, and line 8 shows the average sunlight admitted to the plants throughout the indicated twelve-hour period from 6 a. m. to 6 p. m. As this figure and these curves show, the maximum intensity of sunlight is about 14,000 foot candles, while the maximum amount of that light which is admitted to the plants through the painted glass roof of the greenhouse, as indicated by curve 7, is about 3700 ft. candles; and the average amount of sunlight admitted over the twelve-hour period, as indicated by line 8, is about 2200 ft. candles.

Figure 3:
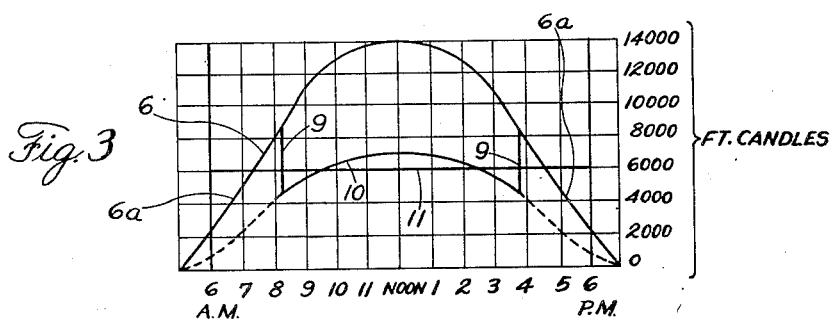
Fig. 3 is a chart showing the total sunlight curve of Fig. 1, the amount of that sunlight admitted to the interior of the greenhouse by my invention throughout a corresponding period of time and the average hourly amount of sunlight so admitted to the plants.

Fig. 3 indicates approximately the amount of light admitted to plants by my invention. In this figure, curve 6, as in Fig. 2, indicates total sunlight available while the amount of sunlight admitted to the plants is indicated by a curve consisting of the parts 6a of curve 6 which extend from the base line up to the upper ends of vertical lines 9, the lines 9 and the arcuate line 10 connecting the lower ends of lines 9. These lines 9 indicate the times when the amount of admitted light is shifted from one curve to the other. As lines 9 indicate, the maximum intensity of sunlight admitted to the plants is about 8200 ft. candles at about 8:15 a. m. and 3:45 p. m. when the angle of the sun's rays is about 37°. The maximum intensity of sunlight admitted to the plants at noon is about 7000 ft. candles and the average amount admitted to the plants throughout the day is indicated by line 11 and is about 6000 ft. candles. Depending on the time of the year and other conditions, the safe limit of sunlight admitted to the plants may vary from about 6000 ft. candles to 8000 ft. candles or even higher.

Figure 4:
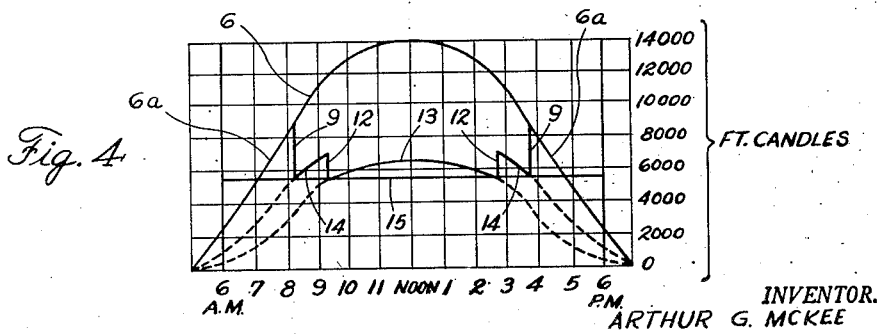
Fig. 4 is a chart similar to Fig. 3 but showing a modification of my invention involving the admission of full sunlight for a certain period of time, a reduced amount of sunlight for an additional period, and a further reduced amount of sunlight for a third period of time.

In Fig. 4, curve 6 is like curve 6 of Fig. 3 and the curve including parts 6a and 9 correspond to similarly numbered parts of Fig. 3. Fig. 4 indicates a modification of the showing of Fig. 3. While the sun is at a higher angle than the 37° indicated by the top ends of lines 9, an additional amount of light is excluded, as is indicated by vertical lines 12 and curve 13. Lines 12 indicate the time of shifting from curve 11 to 13. The line indicating the intensity of light admitted to a greenhouse employing this modification of my invention is indicated by lines 6a from the base line to the tops of vertical lines 9, curved lines 14 connecting the bottoms of lines 9 with the tops of vertical lines 12 and curve 13 connecting the bottom ends of line 12.

As Fig. 4 indicates, the maximum intensity of light admitted to the plants is about 8200 ft.

candles at about 8:15 a. m. and 3:45 p. m. when the angle of the sun's rays is about 37°. When the light is at a maximum of about 7000 ft. candles, and the angle of the rays is about 37° as indicated at about 9:20 a. m., the sun-light admitted is reduced in amount to about 5800 ft. candles. When the intensity falls to about 5800 ft. candles at about 2:40 p. m., the amount of sunlight admitted is increased to about 7000 ft. candles, and when it has decreased to about 5800 ft. candles and the angle has decreased to about 37°, the full amount is admitted as indicated by line 9. The average intensity throughout the twelve-hour period, as indicated by line 15 of this figure is about 5800 ft. candles.

It will be understood from Figs. 1 to 4 inclusive that on a substantially cloudless day in midsummer at Vero Beach, Florida, I propose to admit the full sunlight to the plants from daybreak until about 9:15 a. m., at which time the sun's rays will have reached the critical angle which I now believe to be about 37°. Thereupon, I exclude enough of the sunlight to prevent damage or injury to the plants, this exclusion being indicated by lefthand vertical line 9 in Fig. 3. This exclusion of sunlight reduces the intensity in foot candles which is admitted to the plants. At about 3:45 p. m., when the sun's rays have declined to an angle below the critical angle, I again admit the full sunlight to the plants.

As Fig. 4 indicates, I may exclude an additional part of the sunlight, as shown by lines 12. Obviously the intensity of sunlight could be cut down in more than two stages if desired and any desired amount of sunlight may be excluded in each stage. The amounts of sunlight which should be excluded, and the optimum number of stages in which to exclude it, may be determined for each particular greenhouse locality and for the particular type of plants to be grown. In general, I believe that the maximum angle of 37° for full sunlight may be used safely anywhere in the United States, although in the northern parts a slightly higher angle might be satisfactory.

The amount of light excluded from the interior of the greenhouse, about 40% of the total sunlight, is indicated by lines 9 and 10 of Fig. 3. Similarly, in Fig. 4 about 40% of the sunlight is excluded as indicated by lines 9 and 14 while about 55% of the sunlight is excluded as indicated by lines 12 and 13. Obviously these amounts may be varied as desired and the number of exclusions may be increased and for any desired lengths of time as preferred.

In controlling temperatures in the greenhouse I take advantage of the fact that the heating effect or energy of sunlight varies in proportion to the sine of the angle of incidence. The energy of sunlight per square foot of horizontal surface at an angle of 15° is only about 25% of that when the sunlight is at 90° and at 30° the energy is about 50% of that of 90°, while at 40° it is about 62% of that of 90°. Accordingly, by excluding part of the sunlight from the plants when the angle of the sun's rays is above 37° I effectively reduce the energy available as heat to below about 60% of that when the sun's rays are at 90°. As a result, the interior of the greenhouse may be kept at a desirably low temperature during the hottest part of the day.

In controlling the quality of the admitted light I also take advantage of the fact that the amount of the various light bands of the spectrum which reach the earth vary with the time of day, that is, with the angularity of the rays. As Fig. 1 shows, the sun's rays travel through the earth's atmosphere a maximum distance at sunrise and sunset and a minimum distance at noon. Since the quality of the sunlight varies with these distances due to absorption of varying amounts of the various light bands and deflection of the sunlight, I vary the amount of sunlight admitted to the plants in accordance with such variations of the sunlight. In this manner I raise the average amount of sunlight admitted to the plants and thus accelerate their growth. I also control the admitted light so as to exclude most of the light bands which are not beneficial to plant culture while admitting other bands which are beneficial.

Figure 5:
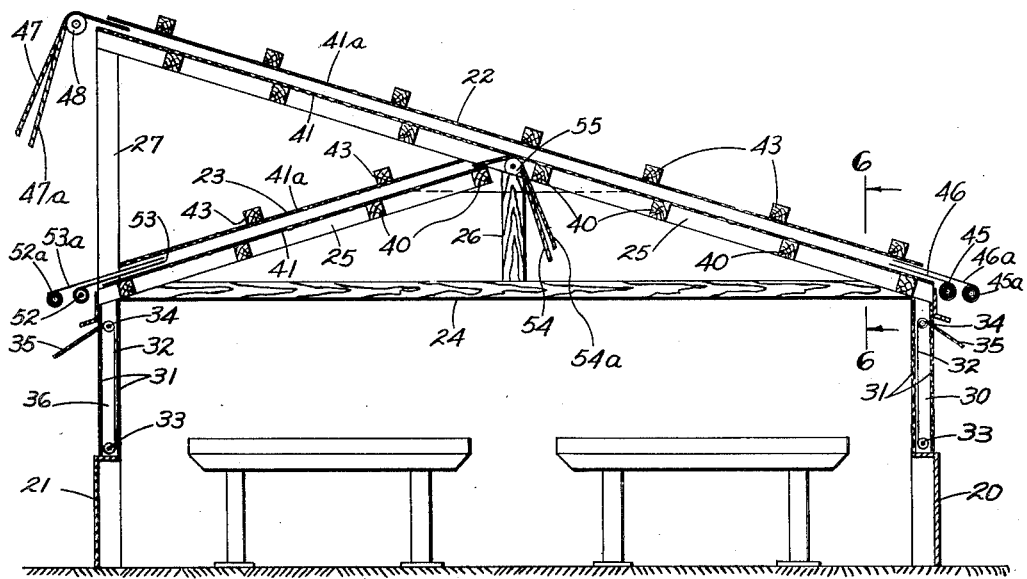
Fig. 5 is a transverse, vertical, sectional view, partly in elevation, of a greenhouse embodying the present invention.
Figure 6:
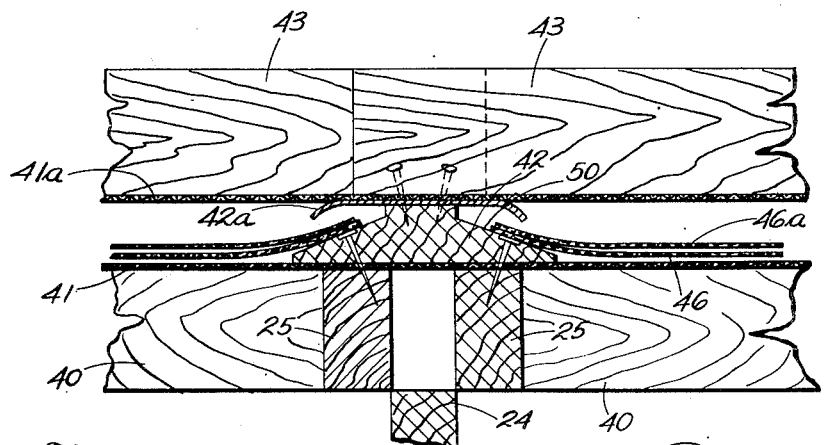
Fig. 6 is a fragmentary, enlarged, vertical, sectional view taken on line 6—6 of Fig. 5; and, Fig. 7 is a sectional view taken transversely through a modified form of greenhouse embodying the present invention.

Figs. 5 and 6 show a greenhouse embodying the present apparatus invention and with which the present method may be practiced. This greenhouse extends east and west and, as these figures show, the greenhouse consists of low south and north walls 20 and 21, respectively, a south roof slope 22 extending from the top of south wall 20 to above the top north wall 21, a north slope 23 extending from the top of the north wall to and intersecting with the south slope midway between its upper and lower ends, and a plurality of trusses each consisting of a bottom truss chord 24 horizontally connecting the tops of the south and north walls, top truss chords or rafters 25 forming parts of the south and north slopes and a vertical strut 26 connecting the bottom chord 24 with the top chords 25. The columns 27 which serve as studding for the north wall extend thereabove and support the upper end of south slope 22.

The south wall 20 is provided with a plurality of openings 30, each equipped with inner and outer wire mesh screens 31 between which a flexible curtain 32 mounted on a roller 33 may be pulled up to a pulley 34 as by rope 35. In this manner these openings 30 may be controlled so as to permit or substantially prevent the flow of air therethrough. Another similar wire mesh 41a is stretched over strips 42 parallel to wire mesh 41.

Openings 36 in the north wall correspond to openings 30 in the south wall and are similarly provided with wire mesh screens 31, curtain 32 on roller 33 to be pulled up to a pulley 34 by rope 35. When the curtains 32 of the openings 30 and 36 are lowered, air may blow through the greenhouse and when the south slope is covered and the north slope of the roof is not completely covered, air may enter through openings 30 and 36 and flow up through the north slope 23 and thus out of the greenhouse.

Purlin members 40 extend horizontally between adjacent top truss chords 25 in both south and north slopes and, together with those chords, constitute a support to which wire mesh 41 is attached. This wire mesh extends over substantially the entire extent of both the north slope 23 and south slope 22 of the greenhouse roof and is tightly stretched. This wire mesh 41 is held in place partly by being secured to purlins 40 and partly by curtain edge supporting strips 42 which extend lengthwise of and are nailed to the top truss chords or rafters 25 on top of the wire mesh, as is better shown in Fig. 6. Purlins 43 extend horizontally and lengthwise of the north and south slopes of the roof on top of wire mesh 41a and are nailed to strips 42 and are secured to and partially support wire mesh 41a.

Near the lower end of the south slope 22 a plurality of curtain rollers 45 are mounted, one or more between each pair of adjacent trusses or rafters. Each of these rollers carries a flexible, translucent, protractile curtain 46 which is connected to a rope 47 passing over pulley 48 just beyond the upper end of slope 22. By manipulating the rope 47 and roller 45 each curtain may be unwound until its upper end reaches to a position substantially above the north wall 21; or it may be retracted to a position over the south wall 20; or adjusted to any desired position between those extremes. A second similar roller 45a, carrying a similar curtain 46a and operated by a rope 47a over pulley 48, is shown in Fig. 6. Either one of these curtains may be used alone or both may be used together.

It will be noted that wire mesh or screens 41 and 41a are positioned close to each other, the vertical distance between them, as indicated by Fig. 6, being about 2″, but this vertical distance may be varied within reasonable limits as desired, the main purpose of these screens being to define spaces between strips 42 in which the curtains may be moved, as by the ropes, but from which they cannot be dislodged by wind.

It will also be noted, by reference to Fig. 6, that strips 42 have upwardly inclined surfaces 50 underlying the edge portions of curtains 46 and 46a. These surfaces bend the edges of the curtains upwardly to a limited extent and thereby give the curtains the shape of a shallow trough in which rain water may flow off the roof without entering the greenhouse and striking the plants.

Preferably metal strips or flashings 42a (Fig. 6) which extend lengthwise of strips 42 may be used to deflect rain away from the edges of the curtains and surfaces 50 and thereby to minimize leakage of water into the greenhouse during storms when the curtains might be lifted temporarily from surfaces 50. During cold weather the curtains resting on the strips prevent flow of air into or out of the greenhouse and thus facilitate heating of the house.

The north slope 23 of the roof is similarly equipped with one or more curtains, as desired. In this case two curtains are shown for each space between a pair of trusses. Curtain rollers 52 and 52a have curtains 53 and 53a thereon and these curtains are connected to ropes 54 and 54a, respectively, which extend over pulley 55 adjacent the intersection of the north and south slopes. By manipulating these ropes either one or both of these two curtains may be extended to any desired position along the north slope. It will be understood that the north slope is constructed substantially the same as has been described for the south slope 22, particularly as regards the deflection of the edges of the curtains and the use of wire screens to limit the extent of vertical movement of the curtains.

While curtains of various material may be used, I prefer to use a suitable plastic. The curtain material should be sufficiently strong to withstand repeated rolling and unrolling actions, sunlight, rain and wind, and at the same time should permit light to pass therethrough. Cellulose butyrate acetate is a plastic which promises to be satisfactory for these purposes, particularly when applied to a mesh fabric, for example, one in which the threads make open rectangles about ¼″ on the side. Of course, it will be understood that a variety of flexible, translucent materials are suitable for this purpose with or without a mesh fabric re-inforcement. I have found that a curtain of the re-inforced plastic composition just described will permit about 80% of the light to pass therethrough. By painting such a curtain with a suitable pigment this total amount of light may be reduced to different amounts, and modified in quality, depending on the pigment used.

Fig. 3 indicates the use of a curtain of this type having enough pigment applied to permit only about 60% of the total light to pass therethrough and Fig. 4 indicates the use of a similar but additional curtain which, however, had enough pigment thereon to admit about 75% of the light reaching it. When both curtains were in use the first one admitted 60% of the total light and the second admitted 75% of the light reaching it or 45% of the total sunlight. Thus, the two curtains cut down the light admitted to 45% of the total light available. Of course, it will be obvious that instead of using a screen admitting 60% of light with another one admitting 75% the curtains can be coated with sufficient pigment to permit any desired percentages of light admission.

In this way I am able to attain the high average of admitted sunlight shown by lines 11 and 15 of Figs. 3 and 4. By using any of the pigments which have well known properties of absorbing different light bands, curtains may be provided which will not only reduce the amount of admitted light but will also admit desired light bands thereof and exclude undesired light bands.

The foregoing discussion of angles of sun's rays and times of day when the curtains are rolled up or down, relates only to mid-summer conditions on clear, cloudless days. However, light and heat conditions vary widely from day to day due to weather conditions, clouds, rain, etc., and from week to week through fall to mid-winter. The sunlight angle at noon in summer at Vero Beach, Florida, is about 86° while in mid-winter it is about 40°. It is, therefore, evident that as the sunlight angle at noonday decreases the time of raising the curtains in the mornings becomes later and of lowering them in the afternoon becomes earlier until in mid-winter curtains may be left down or open nearly the entire day and at points further north, say at St. Louis, Mo., there is no need to close the curtains at all for three or four months during the winter season, except when the temperatures are so low as to require artificial heating, and during the entire year the curtains may be left open while the sun is obscured by clouds.

This last factor is very important in locations where cloudy weather is frequent, thus giving the plants an increased amount of light without injuring them.

Figure 7:
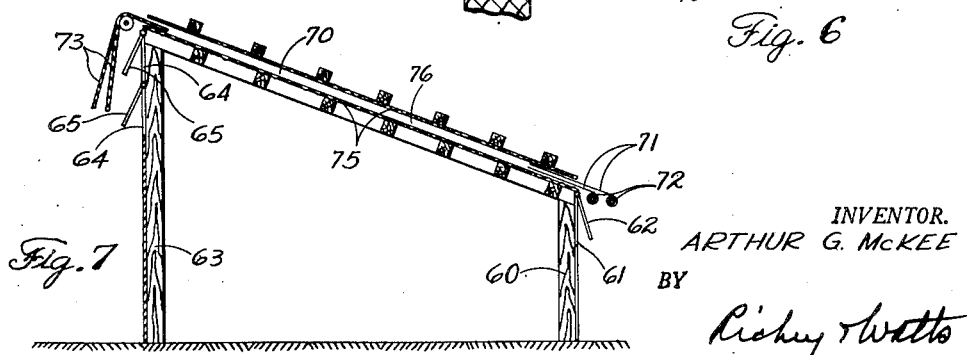

The greenhouse of Fig. 7 is quite like that of Figs. 5 and 6 in many respects but differs in other respects. It is to extend east and west with a low south wall 60 having openings 61 and hinged closure 62 therefor, a higher north wall 63 having openings 64 and hinged closures 65 therefor. The openings 64 are higher than openings 61 so that a circulation of air through the greenhouse will be induced when the closures are swung open and the air in the greenhouse is heated by the sunlight.

The roof 70 is substantially like the south slope of the greenhouse of Figs. 5 and 6 but the greenhouse lacks the north slope of the house of those figures. In roof 70 two curtains 71, like 46 and 46a are mounted on rollers 72, lines 46 and 45a and are connected to ropes 73, like 47 to roll up or down between upper and lower screen wire 75, like 41 and 41a and between strips 76, like 42.

Metal flashings, like 42a (Fig. 6) may be used if desired.

Subject matter disclosed but not claimed in this application is being claimed in one or another of my copending applications Serial No. 96,490, filed June 1, 1949; Serial Nos. 261,968, 261,969 and 261,970, all filed on December 17, 1951.

Having thus described my invention so that others skilled in the art may be able to understand and practice the same, I state that what I desire to secure by Letters Patent is defined in what is claimed.

What is claimed is:

1. A rectangular greenhouse having substantially parallel, vertical north and south walls extending in an east and west direction and a roof including a south slope and substantially parallel rafters inclined upwardly from the top of said south wall to a point substantially vertically above the north wall, flexible, translucent, retractile curtains disposed in said slope with their side edges overlying and supported by adjacent rafters, means above and below said curtains for their full widths to restrain vertical movements thereof, rollers near one end of said south slope and connected respectively to said curtains for rolling the latter therearound, and means attached to the other end of each of said curtains for moving it endwise between said vertical-movement-restricting means and unrolling it from said roller.

2. A greenhouse having north and south walls extending in an east and west direction and a double sloped roof, said roof including a south slope inclined upwardly from the top of said south wall to a point substantially vertically above the north wall, a north slope inclined upwardly from the top of the north wall to intersect with said south slope, flexible, translucent, retractile curtains in each of said slopes, and means above and below said curtains to restrain vertical movements thereof.

3. A greenhouse extending east and west having north and south walls provided with closable ventilator openings, and a roof including north and south slopes each having protractile, translucent, waterproof, flexible means therein, said means in the south slope being extensible from the top of the south wall to a point substantially vertically above the north wall and above said north slope, and means to adjust independently the extensions of said means in said slopes.

4. A greenhouse roof comprising trusses including top chords, strips on said top chords and having laterally sloping surfaces, open mesh fabric fixed above and below said strips, and a flexible, translucent curtain on the lower fabric with its edge portions inclined upwardly on said surfaces, the curtain defining a longitudinal, inclined shallow trough capable of carrying off water during a rain storm.

5. A greenhouse comprising a south wall, a flexible, protractile curtain sloping upwardly and northwardly from the top of the south wall, open mesh fabric underneath and supporting said curtain, and means extending longitudinally along the edges of said curtain having surfaces sloping upwardly from their edges and engaging the underside of the longitudinal edge portions of said curtain and deflecting those portions to above the remainder thereof.

6. A greenhouse roof comprising trusses including top chords, plates on said top chords having top surfaces sloping upwardly from their longitudinal edges, open mesh fabric above and below said plates, flexible, protractile curtains between said fabrics with their longitudinal edge portions resting on said sloping surfaces and extending to above the remainder thereof.

7. A greenhouse having north and south walls extending east and west and having a roof consisting of a plurality of parallel, protractile, flexible, translucent curtains extending upwardly from the top of the south wall to a point approximately over the north wall, means to support said curtains, and open mesh means above and below said curtains for limiting the extent of their vertical movement, said greenhouse having ventilating openings through both said walls, the openings through the north wall being higher than those through the south wall and extending downwardly from the north edge of the roof, and means for moving the curtains endwise between said open mesh means.

8. A greenhouse having a south wall, a higher north wall and a roof, said roof including parallel trusses extending upwardly from above the south wall to above the north wall, strips extending lengthwise of and secured to said trusses, each of said strips having surfaces sloping upwardly from the opposite longitudinal edges thereof, lower horizontal purlins having their top surfaces substantially flush with the top surfaces of said trusses, upper horizontal purlins secured on the tops of said strips, open mesh fabric on the tops of said lower purlins and on the under sides of said top purlins and defining inclined curtain spaces between the trusses, protractile, flexible, translucent curtains impervious to air and water positioned between adjacent strips with their longitudinal side edges resting on said upwardly sloping surfaces of opposed strips, and means for moving the curtains endwise between said open mesh fabrics.

9. A greenhouse having a south wall, a higher north wall and a roof, said roof including parallel trusses extending upwardly from above the south wall to above the north wall, horizontal lower and upper purlins spaced apart vertically, open mesh fabric on the tops of said lower purlins and on the under sides of said upper purlins and defining inclined curtain spaces between the the trusses, and protractile, flexible, translucent curtains impervious to air and water positioned between adjacent trusses, and movable endwise between said open mesh fabrics.

ARTHUR G. McKEE.

References Cited in the file of this patent

UNITED STATES PATENTS

| Number | Name | Date |
|---|---|---|
| 715,185 | Warner | Dec. 2, 1902 |
| 1,648,257 | Burke | Nov. 8, 1927 |
| 1,682,005 | DeZonia | Aug. 28, 1928 |
| 1,718,215 | Burrage | June 25, 1929 |
| 1,789,513 | Burrage | Jan. 20, 1931 |
| 2,031,157 | Gilson | Feb. 18, 1936 |
| 2,046,601 | Atkinson | July 7, 1936 |
| 2,069,292 | Walker | Feb. 2, 1937 |
| 2,445,368 | Scharnhorst | July 20, 1948 |

FOREIGN PATENTS

| Number | Country | Date |
|---|---|---|
| 800,208 | France | Apr. 27, 1936 |
| 386,280 | Great Britain | Jan. 12, 1933 |